United States Patent
Suggs (10) Patent No.: US 9,691,125 B2
(45) Date of Patent: Jun. 27, 2017

(54) TRANSFORMATION OF IMAGE DATA BASED ON USER POSITION

(75) Inventor: Bradley Neal Suggs, Sunnyvale, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 14/357,801

(22) PCT Filed: Dec. 20, 2011

(86) PCT No.: PCT/US2011/066200
§ 371 (c)(1),
(2), (4) Date: May 13, 2014

(87) PCT Pub. No.: WO2013/095389
PCT Pub. Date: Jun. 27, 2013

(65) Prior Publication Data
US 2014/0313230 A1    Oct. 23, 2014

(51) Int. Cl.
*G06T 3/00* (2006.01)
*G06F 1/32* (2006.01)
*G06F 3/01* (2006.01)
*G09G 5/00* (2006.01)

(52) U.S. Cl.
CPC .......... *G06T 3/0006* (2013.01); *G06F 1/3231* (2013.01); *G06F 1/3265* (2013.01); *G06F 3/013* (2013.01); *G06T 3/00* (2013.01); *G09G 5/00* (2013.01); *G06F 2203/04806* (2013.01); *G09G 2340/04* (2013.01); *G09G 2340/14* (2013.01); *G09G 2354/00* (2013.01); *Y02B 60/1242* (2013.01); *Y02B 60/1289* (2013.01)

(58) Field of Classification Search
CPC ......... G06F 1/3231; G06F 2203/04806; Y02B 60/1242; Y02B 60/1289
See application file for complete search history.

(56) References Cited

U.S. PATENT DOCUMENTS

| 5,710,876 | A | | 1/1998 | Peercy et al. |
| 5,926,580 | A | * | 7/1999 | McCoy ................. G06F 17/15 382/279 |
| 6,152,563 | A | * | 11/2000 | Hutchinson et al. ......... 351/209 |
| 6,370,192 | B1 | * | 4/2002 | Pearlstein ............. H04N 19/30 375/240 |
| 6,525,772 | B2 | | 2/2003 | Johnson et al. |

(Continued)

FOREIGN PATENT DOCUMENTS

| CN | 1897682 | 1/2007 |
| CN | 1937716 | 3/2007 |

(Continued)

OTHER PUBLICATIONS

International Search Report and Written Opinion, International Application No. PCT/US2011/066200, Sep. 10, 2012, pp. 1-7.

*Primary Examiner* — Ke Xiao
*Assistant Examiner* — Jed-Justin Imperial
(74) *Attorney, Agent, or Firm* — HP Inc. Patent Department (57) ABSTRACT

A user position can be detected or determined using a sensor. A transformation can be applied to the image data based on the user position. The transformed image data can be displayed on a display.

15 Claims, 6 Drawing Sheets

(56) References Cited

U.S. PATENT DOCUMENTS

| | | | |
|---|---|---|---|
| 6,806,903 B1* | 10/2004 | Okisu | G06K 9/38 348/222.1 |
| 6,954,193 B1* | 10/2005 | Andrade et al. | 345/90 |
| 7,609,228 B1* | 10/2009 | Teng | G03B 5/04 345/1.3 |
| 8,913,004 B1* | 12/2014 | Bozarth | G06K 9/00604 345/156 |
| 2002/0085119 A1* | 7/2002 | Van Overveld et al. | 348/553 |
| 2008/0231702 A1 | 9/2008 | Matsumoto et al. | |
| 2009/0073324 A1 | 3/2009 | Tan et al. | |
| 2009/0082066 A1 | 3/2009 | Katz | |
| 2009/0238490 A1* | 9/2009 | Tamura | G09G 5/393 382/275 |
| 2010/0060575 A1 | 3/2010 | Ohta | |
| 2010/0167783 A1* | 7/2010 | Alameh et al. | 455/556.1 |
| 2010/0231690 A1 | 9/2010 | Fujieda et al. | |
| 2011/0141115 A1 | 6/2011 | Brandes et al. | |
| 2011/0248987 A1 | 10/2011 | Mitchell | |
| 2012/0105486 A1* | 5/2012 | Lankford et al. | 345/661 |
| 2013/0044124 A1* | 2/2013 | Reichert, Jr. | 345/618 |
| 2014/0313230 A1 | 10/2014 | Suggs | |

FOREIGN PATENT DOCUMENTS

| | | |
|---|---|---|
| CN | 100590589 C | 2/2010 |
| CN | 101990079 | 3/2011 |
| CN | 102273083 | 12/2011 |
| JP | 2006-284639 A | 10/2006 |
| WO | 2010118292 | 10/2010 |
| WO | WO-2011/059298 A2 | 5/2011 |
| WO | WO-2011100436 A1 | 8/2011 |

\* cited by examiner

TRANSFORMATION OF IMAGE DATA BASED ON USER POSITION

BACKGROUND

Many computing devices include a display for displaying text and images. For example, a display can be used to display graphical user interfaces, documents, photographs, images, and the like. Manufacturers of these devices are challenged with providing displays that accurately depict text and images to provide a satisfying user experience.

BRIEF DESCRIPTION OF DRAWINGS

The following detailed description refers to the drawings, wherein.

DETAILED DESCRIPTION

Manufacturers of computing devices, such as smart phones, tablet and slate computers, laptop computers, and the like, are challenged with enabling consumer friendly usage of these devices. For example, manufacturers are challenged with providing displays that accurately depict text and images to provide a satisfying user experience. As described in detail below, various example embodiments relate to image transformation techniques that can enable the accurate depiction of image data on displays.

For example, during a computing session, a user may cause the display of his computing device to change position or may change his position relative to the display. For instance, a display may be tilted back or forward relative to a line of sight of the user, the user may change his position to the left or right of a centerline of the display, and/or the user may alter a distance between him and the display. Any of these things may be considered to change the user's position relative to the display. As a result of the change of position, image data displayed on the display may appear distorted. For instance, if a display is tilted back relative to a user's gaze, images displayed on the display may appear distorted (e.g., a square may appear as a trapezoid and a circle may appear as a lopsided ellipse).

According to an example embodiment, however, the user's position may be detected and the image data may be transformed. The image data may be transformed so that the transformed image data appears to the user from his position largely as the image data was intended to appear (e.g., as the untransformed image data likely would appear from a default position directly in front of the display). Thus, the transformation may reduce the appearance of distortion when the transformed image data is viewed from the user's position. For instance, in the example above the square may appear as a square rather than a trapezoid and the circle may appear as a circle rather than a lopsided ellipse. Accordingly, image data may be depicted in an accurate manner despite a change in user position, thus providing a satisfying user experience. Further details of this embodiment and associated advantages, as well as of other embodiments and applications, will be discussed in more detail below with reference to the drawings.

Figure 1:
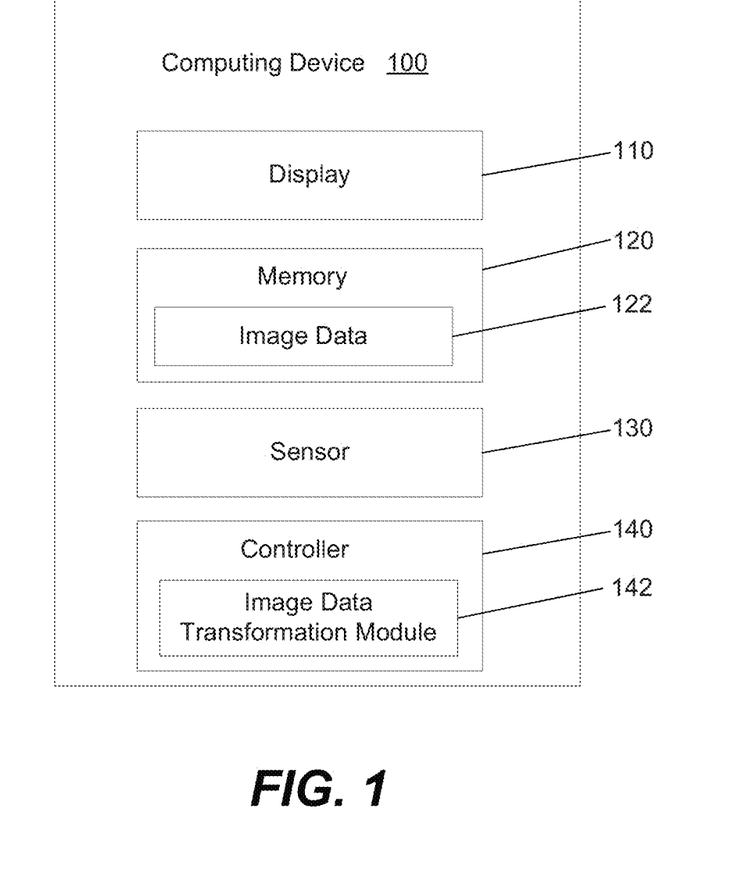
FIG. 1 is a block diagram illustrating a computing device including a display, a sensor, and a controller to transform image data, according to an example.

Referring now to the drawings, FIG. 1 is a block diagram illustrating an embodiment of a computing device 100 including a display 110, a memory 120, a sensor 130, and a controller 140. Computing device 100 may be any of a variety of computing devices. For example, computing device 100 may be a tablet or slate computer, a laptop computer, a desktop computer, a cellular telephone, or a smart phone, among others.

Computing device 100 may include a display. Display 110 may be any of various display screens. For example, the display may be a display integrated into computing device 100, such as in the case of tablet computers and all-in-one computers. The display may also be a display remotely connected to computing device 100, such as a LCD monitor. Furthermore, the display may be a touch sensitive display. Display 110 may be used for various purposes, such as to display a user interface, text, images, and movies.

Computing device 100 may include memory 120, such as a machine-readable storage medium. The machine-readable storage medium may be any electronic, magnetic, optical, or other physical storage device that contains or stores data and/or executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory.

Memory 120 may store various data. For example, memory 120 may store image data 122. Image data 122 may be data that is to be displayed on display 110. Image data 122 may include user interfaces, images, text, documents, photographs, videos, and the like.

Image data 122 may be configured such that it appears without distortion from a first position relative to display 110. The term "without distortion" may mean "without noticeable distortion." Accordingly, "without distortion" may signify that a user may not detect or perceive any visual distortion of the displayed image data if the user is viewing the image data from the first position.

The first position may correspond to a default user position. For example, the default user position may be a position in which the user's eyes are located directly in front of and in the center of display 110. Additionally, the default user position may be one in which the angle of incidence of the user's gaze on the display surface of display 110 is zero degrees. Thus, when image data 122 is displayed on display 110, it may appear without noticeable distortion when viewed from the first position.

Computing device 100 may include a sensor. Sensor 130 may be used to detect and/or determine a second position of a user relative to display 110. The second position may represent a current position or perspective of the user. Sensor 130 may include any of various sensors to determine a position or perspective of the user.

For example, sensor 130 may be a digital camera integrated into computing device 100, attached thereto, or integrated into or attached to a display associated with computing device 100, such as display 110. The camera may be or include an image sensor. For example, the image sensor may be a charge coupled device (CCD) image sensor or a complementary metal oxide semiconductor (CMOS) image sensor. The camera may include a processor, such as a digital signal processor, but may also be controlled by a separate processor in computing device 100, such as controller 140. In addition, the camera may be a stereo camera with multiple lenses and image sensors for capturing three-dimensional images. Sensor 130 may also be or include a tilt sensor. The tilt sensor may be embedded in or attached to display 110 and/or computing device 100 and may be configured to detect a degree of tilt of display 110. Other sensors for detecting the position of the display or the user may be used as well, such as a sound detector (e.g., a microphone), a heat sensor (e.g., a thermographic camera), a vibration sensor (e.g., a gravimeter), an orientation sensor (e.g., an accelerometer), an infrared light sensor, and the like. Furthermore, a combination of sensors may be used.

Sensor 130 may include logic, such as machine-readable instructions, for detecting and recognizing objects in an image represented by image data, and determining the position of the objects. Thus, for example, facial recognition techniques may be used to detect a user's face in an image sensed by a digital camera. Furthermore, the location of the user's eyes and pupils may be determined using the facial recognition technology and/or eye detection technology, thus enabling a more accurate determination of a user's perspective. For instance, the user's line of sight may be determined in this manner. Another technique of determining a location of the user's eyes and pupils is to shine infrared light and sense a reflection of the light from the user's eyes. Alternatively, the location of the user's eyes may be estimated based on the location of the user's head. For instance, if a heat sensor is used, the location of the head of the user may be inferred from the heat image and the location of the user's eyes may be estimated based on statistical data regarding the average location of a human being's eyes on his head.

Sensor 130 and any associated logic may be implemented using controller 140, using a digital signal processor of the camera, or using another processor, in combination with instructions stored in memory.

The second position determined or detected by sensor 130 may include one or more components corresponding to different aspects of a position of the user. For instance, the second position may include one or more values, vectors, or the like, each one representing an aspect of the position.

The second position may include as a component a degree of tilt of display 110 relative to a line of sight of the user. For example, a line of sight of the user may be determined using a camera, such as a digital or thermographic camera, and/or a tilt sensor. Other sensors, such as an accelerometer, may be used as well.

The second position may include as a component a location of the user relative to a centerline of display 110. For example, the location of the user relative to a centerline of the display can be determined using a camera, such as a digital or thermographic camera. The location may represent a user's position to the right or left of a vertical centerline of the display. Additionally, the location may represent a user's position above or below a horizontal centerline of the display. These centerlines may be virtual centerlines represented in a grid which is created based on the sensor's field of view, for example. The grid may be represented as a bitmap. The formation of the grid may take into account a relationship of the display to the location of the camera, so that the center of the grid corresponds to a center of the display. The location of the user on the grid may be determined and compared to the centerlines of the grid. The location may be used to determine an angle of incidence of the user's gaze on the display surface. Other sensors, such as an infrared light sensor, may be used as well.

The second position may include as a component a distance of the user from display 110. For example, the distance of the user from the display can be determined using a camera, such as a digital or thermographic camera. The distance can be estimated based on the size of the user in the grid, based on the size of the user relative to the user's surroundings, etc. Other sensors, such as a noise sensor, may be used as well.

The second position may include any one or all of these components. The user's position or perspective may be more accurately determined using all of the components. Other methods of determining a user's position or perspective may be used as well.

Computing device 100 may include controller 140 having image data transformation module 142. Controller 140 may include a processor and a memory for implementing image data transformation module 142. The memory may be any of various machine-readable storage mediums, such as described with respect to memory 120. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions, such as generating, processing, and transmitting image data. As an alternative or in addition to retrieving and executing instructions, the processor may include at least one integrated circuit (IC), other control logic, other electronic circuits, or combinations thereof that include a number of electronic components for performing various tasks or functions.

Image data transformation module 142 may transform image data 122 based on the second position of the user determined by sensor 130. The transformed image data may appear from the second position as image data 122 would appear from the first position. Thus, for example, the transformed image data may appear with less distortion than would have been visible had the image data not been transformed.

However, some distortion or visual defects may not be correctable by image data transformation module 142. For example, if the display is tilted back relative to a user's line of sight, the display area (and, consequently, the image data) may appear with less height than if the display were viewed straight-on. Accordingly, the transformed image data appearing from the second position as the image data would appear from the first position is not meant to signify that the transformed image data appears (or is perceived by the user) exactly as the untransformed image data would appear (or be perceived) from the first position. Rather, it is meant to signify that the transformation reduces some distortion that results from the user's position or perspective relative to the display. Other distortions or defects beyond the one described above may exist that also may not be correctable by image data transformation module 142.

Image data transformation module 142 may transform the image data using a matrix transformation, such as a perspective transformation. For example, position and angle vectors may be determined based on the second position detected by sensor 130. For instance, the distance and angle between the detected position and the center of sensor 130's field of view of display 110's display area may be determined. The center of sensor 130's field of view or of display 110's display area may be considered the first position. Accordingly, the change in position or perspective from the first position to the second position may be determined. A perspective transform may then be applied to the image data that is to be displayed on display 110 to accommodate for the change in position or perspective. The perspective transform may essentially correct, counteract, or reverse some of the distortion that would otherwise result from viewing the image data from the second position. Display 110 may then display the transformed image data.

Image transformations may be described as sets of mathematical transformation functions represented by mathematical equations. Each pixel in the image data may be transformed based on the mathematical transformation functions to obtain a set of output pixels, which together may represent the transformed image data. For example, each pixel may be associated with a pixel location represented by coordinates ($x_{in}$, $y_{in}$). An appropriate transformation function based on the type of distortion to be corrected (e.g., distortion due to a tilt of the display downwards, distortion due to a tilt of the display upwards, distortion due to a location of the user to the left of the vertical centerline, distortion due to a location of the user to the right of the centerline) may be selected. For example, if the display is tilted down, the appropriate transformation function may operate to foreshorten the image data, while if the display is tilted up/back, the appropriate transformation function may do the opposite. A perspective transformation may have one or more constants which determine the amount and smoothness of the perspective transformation effect. These constants may be determined based on the second position. For instance, the difference between the second position and the first position may be used to determine an appropriate value for the one or more constants in order to reduce the distortion. The output of the transformation may be a set of coordinates ($x_{out}$, $y_{out}$) for each pixel, which may represent the new location of each pixel. The image data may then be displayed in accordance with the new pixel locations.

In an example in which the second position includes a single component, such as a tilt of display 110, a single transformation may be applied. For example, a perspective transformation based on the tilt of the display may be calculated and applied to the image data. This transformed image data may then be displayed on display 110.

In an example in which the second position includes multiple components, such as a tilt of display 110 and a location of the user to the right or left of a vertical centerline, multiple transformations may be successively applied. For example, a perspective transformation based on the tilt of the display may be first calculated and applied to the image data. Then, a perspective transformation based on the location of the user to the right or left of the vertical centerline may be calculated and applied to the transformed image data. This twice-transformed image data may then be displayed on displayed 110.

In some embodiments, the change in position or perspective (i.e., the difference between the first position and the second position) determined by controller 140 may be compared to a threshold value before applying a transformation. If the amount of change in position or perspective does not meet the threshold value, the transformation may not be applied. In one example, the different components of the position/perspective (e.g., angle of tilt of the display, location of the user relative to a centerline of the display, distance of user from the display) may be individually compared to a corresponding threshold to determine whether to apply a transformation. Accordingly, minor changes in position where distortion of the image data may be small or not detectable by the human eye may be ignored. This can save processing time.

In some examples, if the distance of the user from the display exceeds a threshold value, a perspective transform may not be applied. This is because the appearance of distortion of displayed image data may lessen as the distance of the user from the display increases. In addition, a perspective transform may not be applied if multiple users are detected by sensor 130. This is because the position or perspective of the multiple users may be different, and thus it may be difficult to accommodate the positions/perspectives of both users.

Computing device 100 may include additional components and features as well, beyond those depicted in FIG. 1 and described above.

FIGS. 2 and 3(a)-3(c) illustrate a sample use case and image data transformation.

Figure 2:
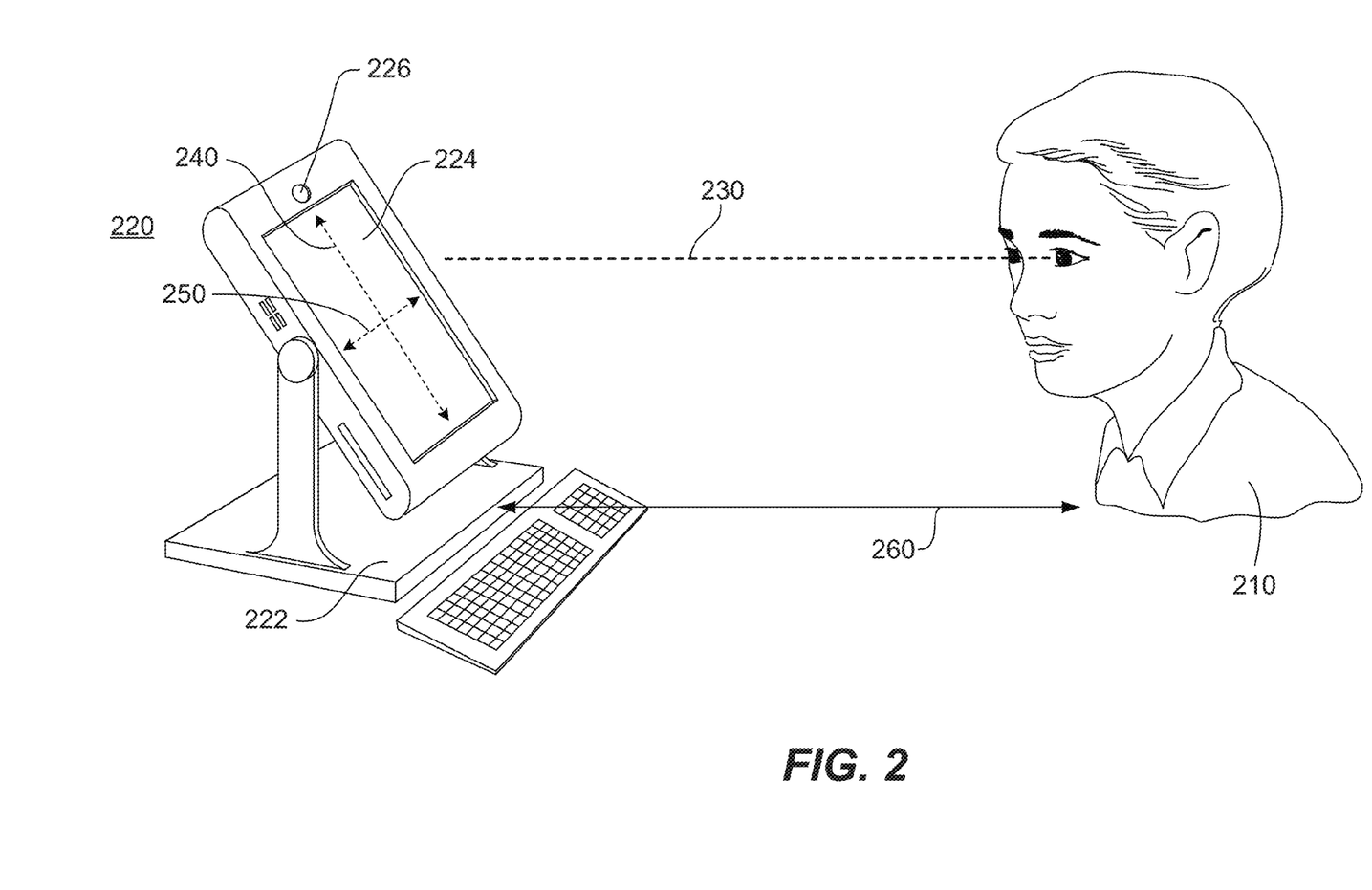
FIG. 2 is a depiction of a sample use case relating to devices and methods disclosed herein, according to an example.

In FIG. 2, user 210 is looking at computer 220. Computer 220 may be an all-in-one computer, in which the display and other computer components (e.g., processor, memory) are combined. Computer 220 has a base 222, a display 224, and a camera 226. Computer 220 may also have a tilt sensor.

Display 224 is tilted back relative to a line of sight 230 of user 210. The line of sight 230 may be detected using camera 226 by sensing an image of user 210 and the surroundings and using facial recognition techniques to determine a location of the user's eyes and/or pupils. A line of sight from the user's eyes or pupils to a center of the display 224 or to a center of a field of view of camera 226 may be determined. The tilt of the display screen relative to the line of sight may be determined using an input from the tilt sensor in conjunction with the determined line of sight of the user. Alternatively, the tilt of the display screen relative to the line of sight may be determined using only the image data from camera 226 by using facial and object recognition techniques.

Camera 226 may also detect a location of user 210 relative to display 224, such as relative to a centerline 240 and/or a centerline 250 of display 224. Additionally, camera 226 may detect a distance 260 of user 210 from display 224.

In this example, the location of the user relative to centerlines 240, 250 and the distance 260 of the user from display 224 are within a threshold amount of a first position associated with image data to be displayed on display 224. However, the tilt of the display relative to line of sight 230 of user 210 is determined to exceed a threshold value. Accordingly, a perspective transform may be used to reduce distortion that may otherwise result due to viewing the image data from the user's detected position.

Figure 3A:
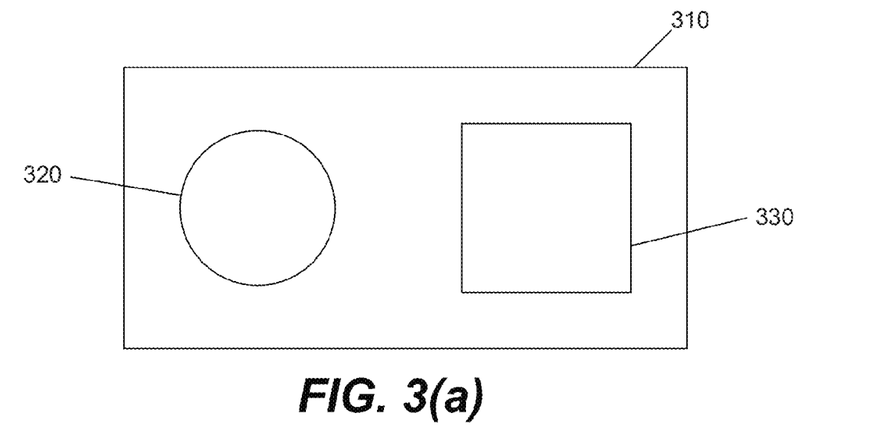
FIG. 3(a) is a depiction of image data as it is intended to appear from a first position relative to a display, according to an example.

FIG. 3(a) depicts image data 310 including a circle 320 and a square 330 as the image data may appear to user 210 if user 210 is in a first position. The first position may be a default position in which displayed image data does not appear with noticeable distortion. For instance, the first position may be a position in which display 224 is not tilted relative to line of sight 230, user 210 is located essentially in the center of centerlines 240, 250, and user 210 is located at a distance 260 that enables proper viewing of the displayed image data.

Figure 3B:
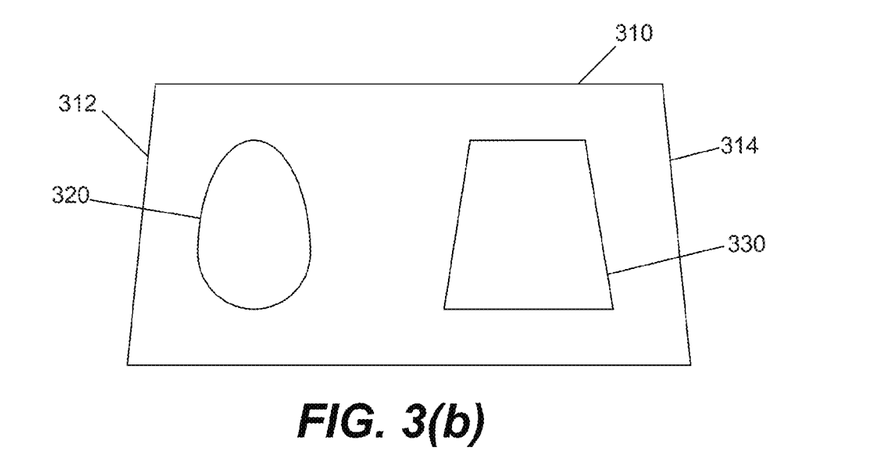
FIG. 3(b) is a depiction of the image data as it might appear from a second position relative to the display, according to an example.

FIG. 3(b) depicts image data 310 as it may appear to user 210 if user 210 is in a second position. The second position may correspond to the user's position as depicted in FIG. 2, where display 224 is tilted back relative to user 210's line of sight 230. Image data 310 appears with some noticeable distortion. Circle 320 appears as a lopsided ellipse, where the lower portion of circle 320 appears wider than the upper portion of circle 320. Square 330 appears as a trapezoid, where the lower portion of square 330 appears wider than the upper portion of square 330. Additionally, the edges 312, 314 of image data 310 may appear to converge slightly due to the tilting of display 224.

Figure 3C:
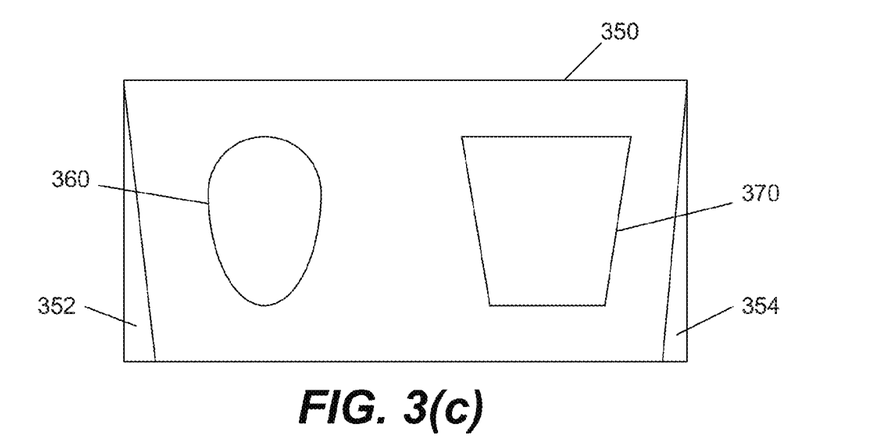
FIG. 3(c) is a depiction of the image data after transformation so as to reduce distortion when viewed from the second position, according to an example.

FIG. 3(c) depicts transformed image data 350, which is image data 310 after a perspective transform has been applied. To illustrate what happens to the image data as a result of the transformation, transformed image data 350 is shown in FIG. 3(c) as it may appear when viewed on display 224 from a first position (e.g., the default position). In such a scenario, image data 350 may indeed appear distorted, as shown. For example, circle 360 appears as a foreshortened ellipse, where the lower portion of circle 360 appears narrower than the upper portion of circle 360. Similarly, square 370 appears as a trapezoid, where the lower portion of square 370 appears narrower than the upper portion of square 370.

However, when transformed image data 350 is viewed by user 210 on display 224 from the second position, in which the display is tilted back as shown in FIG. 2, the image data may appear more like image data 310 as depicted in FIG. 3(a). In other words, the transformation may reduce the appearance of distortion. Accordingly, due to the backward tilting of display 224, circle 360 may appear as undistorted circle 320 in FIG. 3(a) and square 370 may appear as undistorted circle 330 in FIG. 3(a). User 210 may thus have a more satisfying experience since the displayed image data may appear closer to the way it is intended to appear.

Due to the perspective transformation, edges 352, 354 may occur. Edges 352, 354 may result from the slight convergence toward the bottom of image data 350 as a result of the perspective transformation. Edges 352, 354 may be blacked out when image data 350 is displayed on display 224, similar to the use of mattes in letterboxing, which is the practice of transferring film shot in a widescreen aspect ratio to standard-width video format while preserving the film's original aspect ratio. Alternatively, edges 352, 354 may be filled out with additional image data, such as image data that was not originally displayed due to the size of the screen or image data replicated from neighboring pixels of image data 350.

Figure 4:
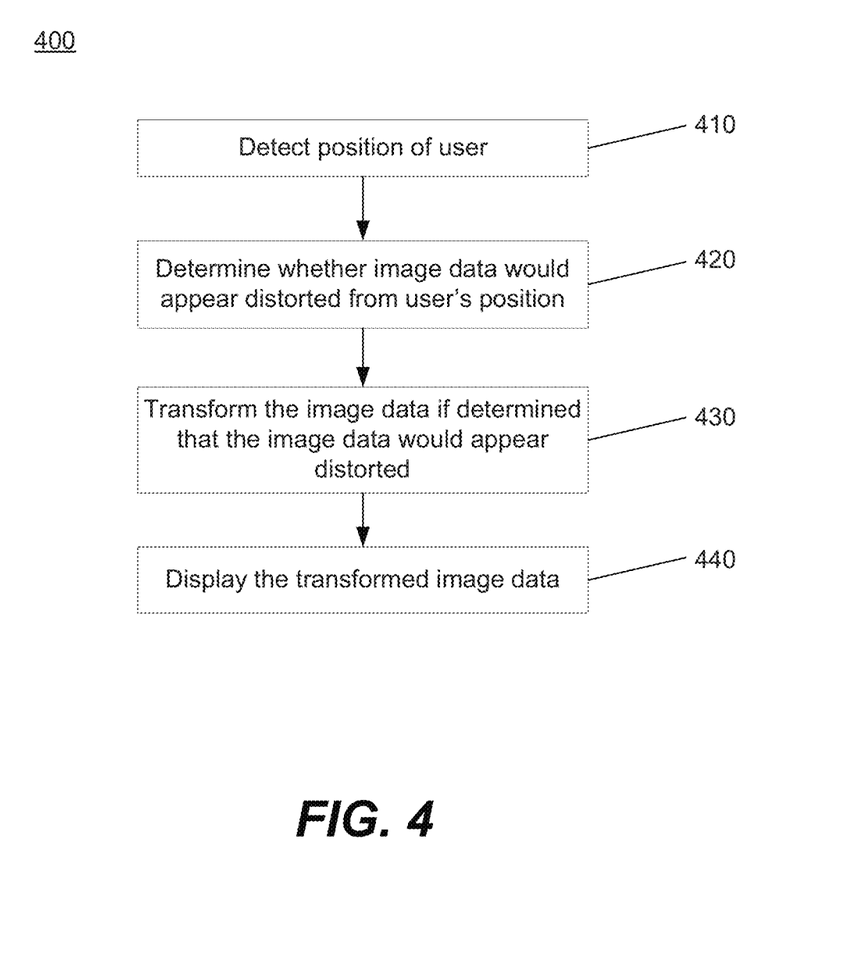
FIG. 4 is a flowchart illustrating aspects of a method for transforming image data, according to an example.

FIG. 4 is a flowchart illustrating aspects of a method 400 executed by a computing device for detecting a user position and transforming image data, according to an example. Although execution of method 400 is described below with reference to the components of computing device 100, other suitable components for execution of method 400 can be used. Method 400 may be implemented in the form of executable instructions stored on a machine-readable medium or in the form of electronic circuitry. A processor, a machine-readable storage medium, other control logic, or a combination thereof can be used to execute method 400.

Method 400 may start at 410 where a position of a user may be detected. For example, the position of the user relative to display 110 may be detected using sensor 130 of computing device 100. At 420, it may be determined whether image data would appear distorted from the user's position. For example, the image data may be image data that is to be displayed on display 110. The image data may be stored in a memory, such as image data 122 in memory 120. It can be determined whether the image data would appear distorted from the user's position using controller 140 by determining the differences between the user's position and another position, such as a default position from which the image data would presumably not appear distorted. For example, the differences may include an amount of tilt of display 110 relative to a line of sight of the user, a location of the user relative to one or more centerlines of display 110 or a center of a field of view of sensor 130, and/or a distance of the user from display 110. If the difference(s) between the detected position and the other position exceeds a threshold value, it may be determined that the image data would appear distorted from the user's position.

At 430, the image data may be transformed if it is determined that the image data would appear distorted from the user's position. For example, a perspective transform may be used to transform the image data. In an example, controller 140 may transform the image data using image data transformation module 142. The image data may be transformed using a perspective transformation based on the user's position. At 440, the transformed image data may be displayed. For example, the transformed image data may be displayed on display 110. As a result, the transformed image data may appear less distorted to the user when viewed from the user's position.

Figure 5:
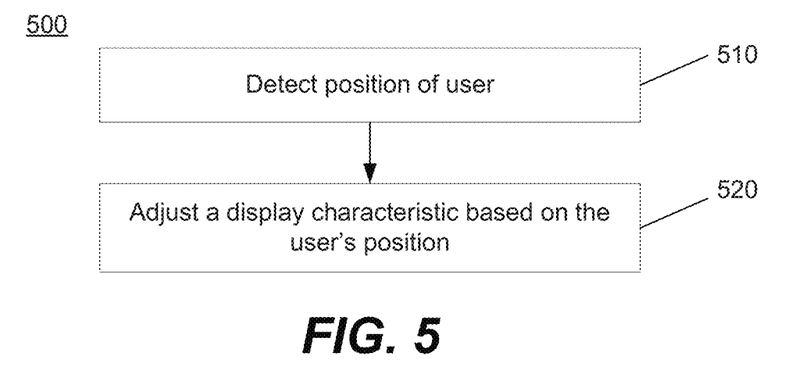
FIG. 5 is a flowchart illustrating aspects of a method for adjusting a display characteristic, according to an example.
Figure 6:
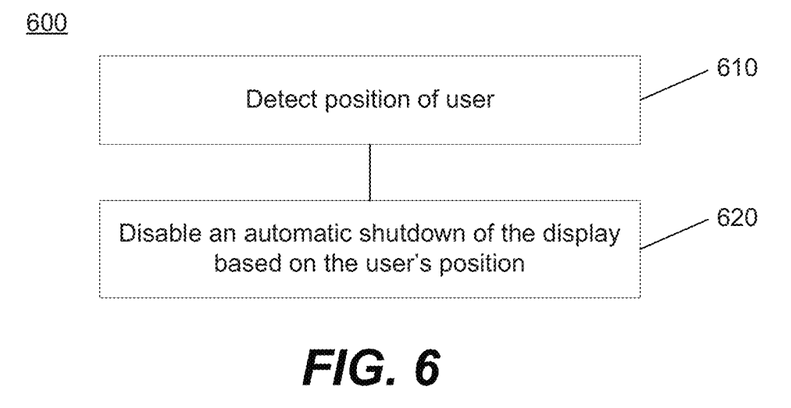
FIG. 6 is a flowchart illustrating aspects of a method for disabling an automatic shutdown of a display, according to an example.
Figure 7:
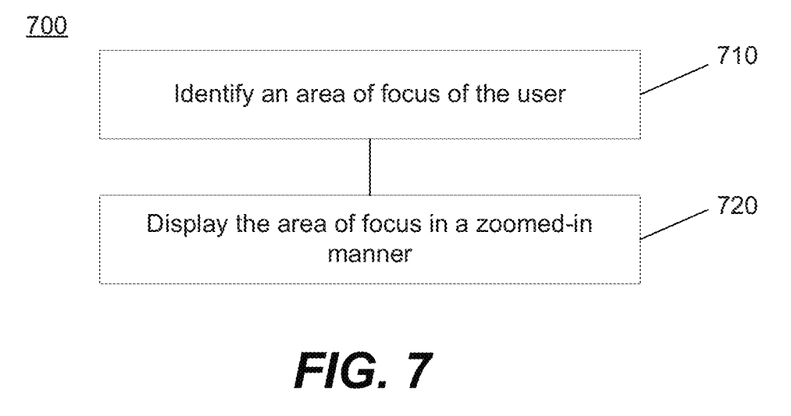
FIG. 7 is a flowchart illustrating aspects of a method for providing zoom-in functionality, according to an example.

Additional functionality may be implemented based on the detection of the user's position. FIGS. 5-7 are flowcharts illustrating aspects of methods 500, 600, 700 that may be executed by a computing device, according to several examples. Although execution of these methods is described below with reference to the components of computing device 100, other suitable components for execution of the methods can be used. Methods 500, 600, 700 may be implemented in the form of executable instructions stored on a machine-readable medium or in the form of electronic circuitry. A processor, a machine-readable storage medium, other control logic, or a combination thereof can be used to execute these methods.

Method 500 may start at 510 where the position of the user may be detected. For example, the user's position may be detected using sensor 130 of computing device 100. At 520, a display characteristic may be adjusted based on the user's position. For example, the brightness of display 110 may be adjusted by controller 140. For instance, if the user is positioned to one side of display 110, the brightness may be increased so as to increase the visibility of displayed image data from the user's position. Other display characteristics that may be adjusted include contrast, color quality, and the like.

Method 600 may start at 610 where the position of the user may be detected. For example, the user's position may be detected using sensor 130 of computing device 100. At 620, an automatic shutdown of the display may be disabled based on the user's position. For example, controller 140 may disable an automatic shutdown of display 110. Automatic shutdown of the display may mean that the display is dimmed or turned off (e.g., put to sleep). Automatic shutdown of the display may also include when the display is turned off as a result of a sleeping mode, a hibernation mode, or a shutdown mode of computing device 100. The automatic shutdown may have been previously enabled and set by the user, or it may be a default setting of computing device 100. Disabling the automatic shutdown may mean merely pausing or delaying an automatic shutdown action, resetting a time period at the end of which the automatic shutdown is set to occur, or temporarily or completely disabling the automatic shutdown feature. As a result of method 600, a situation may be avoided where a user is actively using computing device 100 (though not necessarily inputting commands) and an automatic shutdown action disrupts his computing session.

Method 700 may start at 710 where an area of focus of the user may be determined. For example, the area of focus may be determined using sensor 130 of computing device 100. In one example, a digital camera may be used to detect which portion of display 110 the user's pupils are focused on. Controller 140 may determine the area of focus using facial recognition techniques. Alternatively, sensor 130 may include a pupil tracker, such as on a pair of eye glasses or contact lenses. At 720, the area of focus may be displayed in a zoomed-in manner. For example, display 110 may correlate the user's area of focus with certain image data which is displayed in the determined area of focus on display 110. The correlated image data may be enhanced by zooming. This may permit the user to more easily view the image data that the user was focused on.

Various techniques of displaying the correlated image data may be used. For instance, the correlated image data may be enhanced such that the correlated image data occupies the entire display area of display 110. In addition, other image data not visible on the screen may be scrolled into view and similarly enhanced by the user shifting his gaze up or down and/or to the left and right. Alternatively, the correlated image data may be enhanced such that it overlays the image data surrounding it. Other techniques may be used as well. In some examples, the image data may be again displayed normally (i.e., without zooming in) if the user shifts his gaze completely away from the display.

Figure 8:
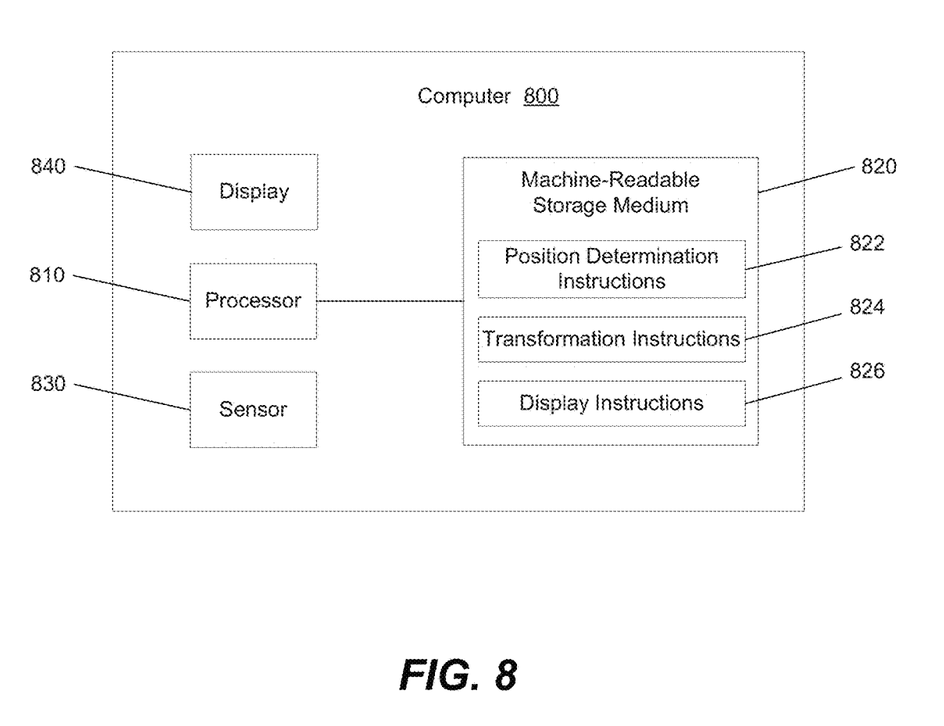
FIG. 8 is a block diagram illustrating a computer including a machine-readable storage medium encoded with instructions to transform image data, according to an example.

FIG. 8 is a block diagram illustrating aspects of a computer 800 including a machine-readable storage medium 820 encoded with instructions to transform image data, according to an example. Computer 800 may be, for example, a tablet computer, a slate computer, a laptop computer, a desktop computer, a smart phone, a personal digital assistant, or the like.

Computer 800 may include a processor 810. Processor 810 may be at least one central processing unit (CPU), at least one semiconductor-based microprocessor, at least one digital signal processor (DSP) such as a digital image processing unit, other hardware devices or processing elements suitable to retrieve and execute instructions stored in machine-readable storage medium 820, or combinations thereof. Processor 810 can include single or multiple cores on a chip, multiple cores across multiple chips, multiple cores across multiple devices, or combinations thereof. Processor 810 may fetch, decode, and execute instructions 822, 824, 826 to implement image data transformation. As an alternative or in addition to retrieving and executing instructions, processor 810 may include at least one integrated circuit (IC), other control logic, other electronic circuits, or combinations thereof that include a number of electronic components for performing the functionality of instructions 822, 824, 826. Accordingly, processor 810 may be implemented across multiple processing units and instructions 822, 824, 826 may be implemented by different processing units in different areas of computer 800.

Machine-readable storage medium 820 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 820 can be computer-readable and non-transitory. Machine-readable storage medium 820 may be encoded with a series of executable instructions for transforming image data.

The instructions 822, 824, 826, when executed by processor 810 (e.g., via one processing element or multiple processing elements of the processor) can cause processor 810 to perform processes, for example, the processes depicted in FIGS. 4-7. Furthermore, computer 800 may be similar to computing device 100 and may have similar functionality and be used in similar ways, as described above.

Position determination instructions 822 may cause processor 810 to determine a position of a user using sensor 830. Sensor 830 may be or include a digital camera, a thermographic camera, a tilt sensor, or the like. Other sensors may be used as well. The determined position can be relative to display 840. Display 840 may be integrated into computer 800 or attached or remotely connected to computer 800. Display 840 may be a touch screen. The user's position can include multiple components. For example, the position may include a degree of tilt of display 840 relative to a line of sight of the user, a location of the user relative to display 840, and a distance of the user from display 840.

Transformation instructions 824 may cause processor 810 to apply a transformation to image data. The image data can be image data that is to be displayed on display 840. The transformation can be based on the user's position. For instance, the transformation may be a perspective transformation designed to reduce an appearance of distortion of the image data from the user's position. In some examples, the transformation may be applied to the image data only if the user's position differs from another position by a threshold amount. For example, the other position may be a default position. The default position may be a position from which the image data would likely appear without distortion.

Display instructions 826 may cause processor 810 to display the transformed image data on display 840.

What is claimed is:

1. A computing device comprising:
a display;
a memory storing image data;

a sensor; and a controller to:

determine a number of users facing the display, using the sensor;

in response to determining that the number of users facing the display is equal to one user:

determine a distance of the one user to the display;

compare the distance to a first threshold and a second threshold greater than the first threshold to yield comparison results;

if the comparison results indicate that the distance is between the first threshold and the second threshold:

determine a position of a user using a sensor, the position comprising a first offset relative to a first centerline of the display and a second offset relative to a second centerline of the display perpendicular to the first offset;

apply a transformation to the image data based on the user's position to reduce an appearance of distortion from the user's position and to correct for the first offset and the second offset; and         display the transformed image data on the display;

if the comparison results indicate that the distance is less than the first threshold or greater than the second threshold, display the image data on the display without transforming the image data to correct for the first offset and the second offset; and     in response to determining that the number of users facing the display is more than one user, display the image data on the display without transforming the image data to correct for the first offset and the second offset, wherein the image data is transformed just if the number of users facing the display is equal to the one user and just if the distance between the user and the display is greater than the first threshold and less the second threshold.

2. The computing device of claim 1, wherein the position of the user relative to the display comprises a degree of tilt of the display relative to a line of sight of the user.

3. The computing device of claim 1, wherein the position of the user relative to the display comprises a location of the user relative to a center line of the display.

4. The computing device of claim 1, wherein the position of the user relative to the display comprises a distance of the user from the display.

5. The computing device of claim 1, wherein the controller is configured to transform the image data based on the position using a perspective transformation.

6. The computing device of claim 1, wherein the sensor comprises a camera.

7. A method comprising:

determining a number of users facing a display, using a sensor;

in response to determining that the number is equal to one user:

determining a distance of the one user to the display;

in response to determining the distance is between a first threshold and a second threshold greater than the first threshold:

determining a position of a user using a sensor, including a first offset relative to a first centerline of the display and a second offset relative to a second centerline of the display perpendicular to the first offset;

applying a transformation to image data based on the user's position to reduce an appearance of distortion from the user's position and to correct for the first and second offsets; and         displaying the transformed image data on the display;

in response to determining that the distance is less than the first threshold or greater than the second threshold, displaying the image data on the display without transforming the image data to correct for the first and second offsets; and in response to determining that the number is more than one user, displaying the image data on the display without transforming the image data to correct for the first and second offsets, wherein the image data is transformed just if the number of users is equal to the one user and just if the distance between the user and the display is greater than the first threshold and less the second threshold.

8. The method of claim 7, wherein the perspective transformation is designed to reduce an appearance of distortion of the transformed image data when viewed from the position of the user.

9. The method of claim 7, further comprising:

adjusting a display characteristic of the display based on the detected position of the user.

10. The method of claim 7, further comprising:

disabling an automatic shutdown of the display based on the detected position of the user.

11. The method of claim 7, further comprising:

identifying an area of focus of the user using the sensor; and displaying the area of focus in a zoomed-in manner on the display.

12. A non-transitory machine-readable storage medium encoded with instructions executable by a processor of a computer to:

determine a number of users facing a display, using a sensor;

in response to determining that the number of users facing the display is equal to one user:

determine a distance of the one user to the display;

compare the distance to a first threshold and a second threshold greater than the first threshold to yield comparison results;

if the comparison results indicate that the distance is between the first threshold and the second threshold:

determine a position of a user using a sensor, the position comprising a first offset relative to a first centerline of the display and a second offset relative to a second centerline of the display perpendicular to the first offset;

apply a transformation to image data based on the user's position to reduce an appearance of distortion from the user's position and to correct for the first offset and the second offset; and         display the transformed image data on the display;

if the comparison results indicate that the distance is less than the first threshold or greater than the second threshold, display the image data on the display without transforming the image data to correct for the first offset and the second offset; and in response to determining that the number of users facing the display is more than one user, display the image data on the display without transforming the image data to correct for the first offset and the second offset, wherein the image data is transformed just if the number of users facing the display is equal to the one user and just if the distance between the user and the display is greater than the first threshold and less the second threshold.

13. The machine-readable medium of claim 12, wherein the transformation is applied to the image data only if the user's position differs from a default position by a threshold amount.

14. The method of claim 7, wherein compensating for the edges comprises blacking out the edges so that the transformed image data when display has the letterboxed appearance.

15. The method of claim 7, wherein compensating for the edges comprises filling out the edges with the additional image data.

* * * * *